Figure 3:
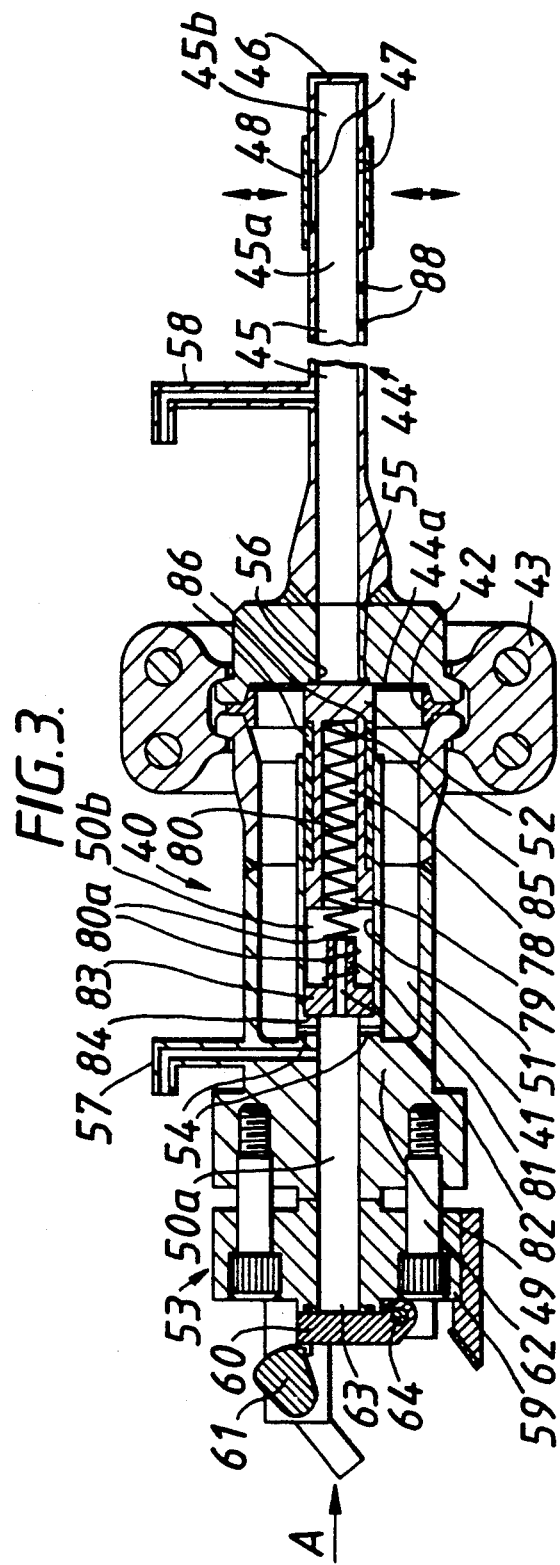

United States Patent [19]

Thomas et al.

[11] Patent Number: 5,270,985
[45] Date of Patent: Dec. 14, 1993

[54] SEISMIC PULSE GENERATION

[75] Inventors: Keith M. Thomas, Sutton; Michael R. Dongworth, Keston; Alec Melvin, Maidenhead, all of England

[73] Assignee: British Gas plc, England

[21] Appl. No.: 943,153

[22] Filed: Sep. 10, 1992

Related U.S. Application Data

[63] Continuation of Ser. No. 511,278, Apr. 23, 1990, abandoned.

[30] Foreign Application Priority Data

Apr. 21, 1989 [GB] United Kingdom ............... 8909067

[51] Int. Cl.$^5$ ............................................. G01V 1/137
[52] U.S. Cl. .................................... 367/142; 367/174; 367/171; 367/146; 181/119; 181/113; 181/106
[58] Field of Search .......................... 181/115-120, 181/109, 113, 106; 367/142, 143, 146, 171, 174

[56] References Cited

U.S. PATENT DOCUMENTS

| | | | |
|---|---|---|---|
| Re. 26,748 | 12/1969 | Schempf | 181/120 |
| 3,310,128 | 3/1967 | Chelminski | 181/119 |
| 3,642,089 | 2/1972 | Parker et al. | 181/120 |
| 3,718,206 | 2/1973 | Bobb et al. | 181/119 X |
| 3,927,557 | 12/1975 | Vierti | 367/150 X |
| 4,108,271 | 8/1978 | Chelminski | 181/119 |
| 4,197,522 | 4/1980 | Christoph | 367/149 |
| 4,467,766 | 5/1987 | Melvin | 181/113 |
| 4,739,859 | 4/1988 | Delano | 181/119 |
| 5,091,891 | 2/1992 | Thomas et al. | 367/144 |

FOREIGN PATENT DOCUMENTS

| | | |
|---|---|---|
| 0189333 | 3/1986 | European Pat. Off. |
| 0331428 | 9/1989 | European Pat. Off. |
| 2229982 | 12/1974 | France |
| 2345734 | 10/1977 | France |
| 1281470 | 7/1972 | United Kingdom |
| 1349135 | 3/1974 | United Kingdom |
| 1556899 | 3/1977 | United Kingdom |

*Primary Examiner*—J. Woodrow Eldred
*Attorney, Agent, or Firm*—Larson and Taylor

[57] ABSTRACT

An acoustic wave energy generator comprises a body having an internal gas-pressurisable first chamber 1 adjoining a second chamber 2 into which a liquid is introduced to cover a vibratable means 4 which may be a flexible diaphragm and is mounted on the second chamber so as to close an associated opening 5 in the second chamber. After the first chamber 1 is pressurised with a first gas a common closed opening between the chambers is opened to cause communication between the chambers 1,2 to permit a shock wave emanating from the first chamber to impinge on the liquid. As a result, the vibratable means 4 is caused to vibrate so as to produce acoustic wave energy in response to the impingement of the shock wave on the liquid. By using different liquids and/or different heights of liquids in the second chamber the generator may be tuned to provide acoustic wave energy with a relatively narrow chosen frequency range or within a chosen substantially single frequency.

32 Claims, 5 Drawing Sheets

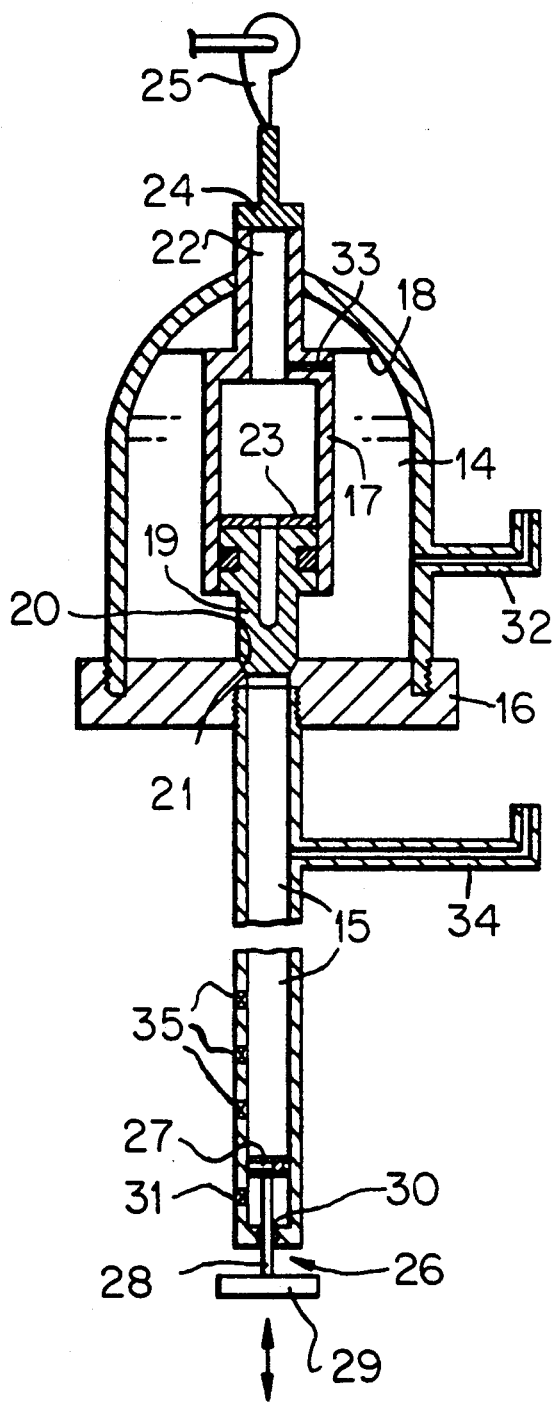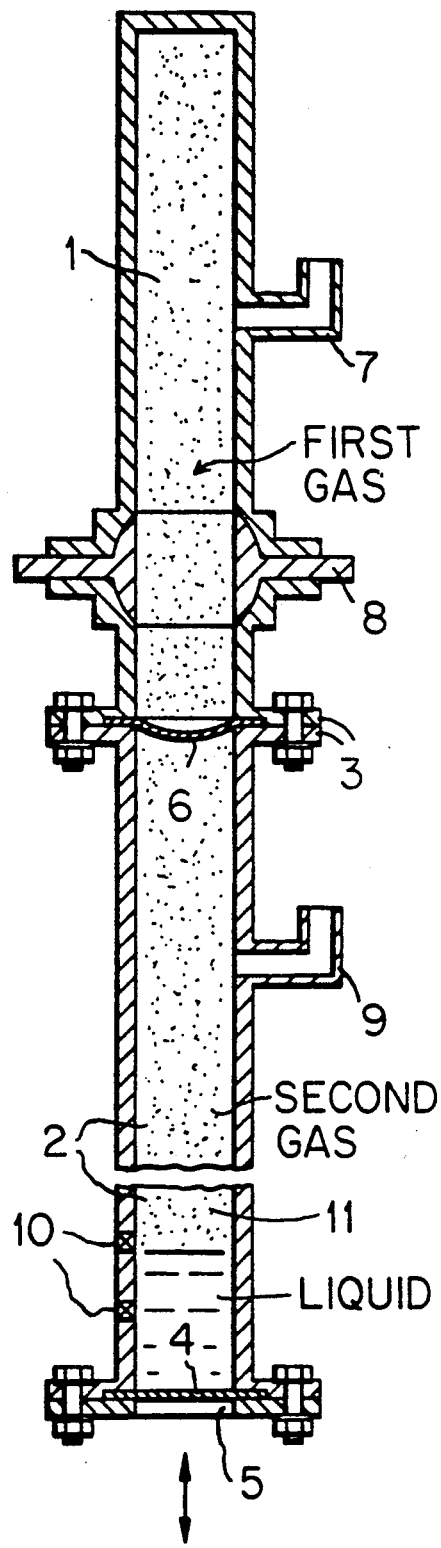
FIG. 2
FIG. 1

SEISMIC PULSE GENERATION

This application is a continuation of application Ser. No. 07/511,278 filed Apr. 23, 1990, now abandoned.

The present invention relates to the generation of seismic pulses and, more particularly, to a method of and apparatus for generating acoustic wave energy.

It is known that seismic sources which provide acoustic wave energy have been used to conduct seismic surveys and have been used in vertical seismic profiling in the tomographic imaging of hydrocarbon reservoirs.

One known method of producing a three-dimensional tomographic map of such a reservoir involves the use of seismic sources and detectors in pairs or arrays of boreholes in the reservoir field area. From the map it may be possible to determine, for example, the size and shape of the reservoir, the optimum siting for production wells and the optimum location for slant or horizontal drilling.

One object of the invention is to provide a method and apparatus for generating acoustic wave energy within a predetermined relatively narrow frequency range and which method and apparatus may be employed to produce acoustic wave energy within different predetermined relatively narrow frequency ranges chosen from a relatively wide overall range of available frequencies. From one aspect of the invention, a method of generating acoustic wave energy comprises producing an acoustic wave in a liquid contained in a chamber of a device to cause a vibratable means mounted on the chamber and spaced from and beneath the surface of the liquid to vibrate and thereby produce acoustic wave energy.

The method may comprise pressurising a gas-pressurisable chamber of the device with a first gas, which gas-pressurisable chamber adjoins the liquid-containing chamber via a common closed opening, and then causing the chambers to communicate by way of the common opening so that the first gas provides a shockwave which impinges upon the surface of the liquid and produces the acoustic wave in the liquid.

The first gas may be helium or hydrogen, or an explosive mixture of air and hydrogen or helium, oxygen and hydrogen and the pressure of the first gas may lie in the range of 20 to 350 bars.

The liquid-containing chamber may be only partly filled with the liquid. In this case a second gas, of lower sound speed and pressure than the first gas, occupies the space in the liquid-containing chamber above the surface of the liquid prior to causing the chambers to communicate.

The second gas may be carbon dioxide, argon or air and the pressure of the second gas in the liquid-containing chamber prior to causing the chambers to communicate may lie in the range 0.5 to 10 bars.

The liquid may for example be methanol.

The vibratable means may vibrate within the overall range 10 to 10000 Hz. Any particular vibratable means may be capable of vibrating over only a limited proportion of the overall range. The low frequency end of the range represents a normal seismic exploration region with relatively low spatial resolution. The upper end of the frequency range has high spatial resolution of short distance range and permits detailed characterisation of the sedimentary structures in the region of the borehole.

Applicants investigations have shown that as a result of causing the chambers to communicate, plane shock-wave energy which is produced can be converted into plane acoustic wave energy within the liquid contained in the device. The acoustic waves have been found to lie in a relatively narrow frequency range. When the liquid completely fills the chamber the shock wave is believed to degenerate to produce the acoustic pulse in the liquid. When the liquid only partially fills the chamber, the shock wave propagates into and through the second gas and meets the surface of the liquid. After penetrating into the liquid the shock is converted to a plane, subsonic acoustic wave with an accompanying pressure amplitude. Applicants have found that the pressure pulse then propagates at roughly the same amplitude through the liquid to the end of liquid-containing chamber, that is the lower part of the chamber directly opposite the surface of the liquid immediately prior to causing the chambers to communicate.

It is believed that the paths taken by the acoustic wave are defined by the law of refraction at the critical angle at the liquid-gas interface such that the wave impinging on the internal surface of the liquid-containing chamber is a liquid surface wave. If the end of the chamber is sufficiently rigid the acoustic pulse is reflected backwards and forwards for a period between the chamber end and the perimeter of the internal surface of the chamber at the height defined by the surface of the liquid to provide a series of pressure pulses.

The interval between pulses appears to be governed by the height of the particular liquid in the chamber. By increasing the height of the liquid, the interval between pulses is increased and hence the frequency decreases. Thus by altering the height of the liquid, pulses of different frequencies can be produced in the liquid. Use of different liquids also results in the production of different acoustic wave frequencies. Consequently, by choosing particular liquids and heights of the liquids the device may be tuned to provide acoustic wave energy within a relatively narrow chosen frequency range or with a chosen substantially single frequency. Substantial monochromaticity for the different frequencies over a wide frequency range would allow choice of spatial resolution in a seismic exploration region.

Where vibratable means is mounted on the liquid-containing chamber to vibrate in response to the acoustic wave in the liquid, acoustic energy can be drawn from the device and the vibratable means acts as a transmitter of pressure to the surroundings. As energy is withdrawn from the device, the pressure amplitude decreases, although the frequency of the acoustic wave energy produced by the vibrating means is substantially unaltered. An external seismic pulse would be made up of a train of amplitude-damped pressure pulses.

From another aspect of the invention, an acoustic wave energy generator comprises a body having an internal gas-pressurisable first chamber adjoining a second chamber into which a liquid can be introduced to cover a vibratable means which is mounted on the second chamber and closes an associated opening or gap in the second chamber, and means which, when the first chamber is pressurised with a first gas and the second chamber is at least partially filled with liquid which covers the vibratable means, is operable to cause opening of a common closable opening between the chambers to cause communication between the chambers to permit a shock wave formed by the first gas to impinge on the liquid, the vibratable means being capable of vibrating so as to produce acoustic wave energy in response to the impingement of the shock wave on the liquid.

The generator may include means for setting the level of liquid in the second chamber at one or more substantially predetermined heights. Such means may be level detection type or may measure volume of liquid introduced into the second chamber from which measurement the liquid level is determined according to, for example, previous calibration between the internal dimensions of the chamber and level of liquid therein.

The vibratable means may be a flexible membrane or diaphragm which may be of planar form and may be made, for example, of suitable metal or reinforced rubber-material or other composite material. The opening which is closed by the membrane or diaphragm may be at the end of the second chamber remote from the first chamber. Alternatively, the vibratable means may comprise a piston comprising an actuatable portion slidable and sealingly mounted in the chamber; a connecting portion which passes through the associated opening and which is in sliding and sealing contact with the portion of the second chamber defining the associated opening; and an external portion outside the second chamber which is connected to the actuatable portion by the connecting portion, and resilient means contained or containable in the second chamber between the actuatable portion and associated opening for spacing the actuatable portion from the associated opening. The resilient means may be a compressed gas. The second chamber may have inlet means for introducing the compressed gas into the chamber.

The vibratable means and common opening may be substantially directly opposite each other and have a substantially common axis.

The vibratable means may have a vibrational axis which, when the generator is in use, is substantially perpendicular to the surface of the liquid in the second chamber immediately prior to the communication between the chambers being effected.

The opening or gap closed by the vibratable means may be in a side or lateral wall of the second chamber. In this case the end of the second chamber remote from the common opening may be of planar form and may be substantially directly opposite to, and share a substantially common axis with, the common opening. Such end may be so disposed that, when the generator is in its operative position in use, it is substantially parallel to the surface of the liquid in the second chamber immediately prior to the communication between the chambers being effected. More over, such second chamber end may itself be a flexible membrane or diaphragm which closes an opening in the second chamber as described earlier.

One or more vibratable means may close two or more openings in one or more side or lateral walls of the second chamber. For example, the vibratable means may be a flexible member of tubular form which can be considered as closing a peripheral or circumferential gap in the second chamber or, alternatively, as forming part of the peripheral or circumferential wall of the second chamber. Such a tubular flexible member vibrates radially and/or longitudinally with respect to the longitudinal axis of the tubular member.

Conveniently, at least the portion of the second chamber for containing the liquid is of substantially straight or rectilinear tubular form, that is the portion has a substantially constant internal cross-section throughout its length.

It will be appreciated that the flexible membrane or diaphragm or member should be sufficiently robust to withstand a plurality of 'firings' of the generator during which the pressure in the second chamber may reach 100 bar or more.

The means operable to cause opening of the common closable opening may comprise a flap valve member rotatable about a pivot axis for closing an opening associated with the first chamber, means for releasably retaining the flap valve member in the closed position, and a gas operated or gas driven piston which is slidably movable within an associated cylinder and which, when the first chamber is pressurised and the flap valve member is released from its closed position to uncover the associated opening, moves to cause the communication between the chambers.

Preferably, the flap valve member is pivotable between open and closed positions about hinge means connected to the generator body, and the retaining means comprises a latch means mounted on the generator body and pivotably movable about pivot means to and from a position wherein it releasably retains the flap valve member in the closed position.

The latch means may overlie and engage the exposed side of the flap valve member, that is the side of the flap valve member remote from the interior of the first chamber, when the member is retained in the closed position.

Conveniently, the generator comprises specific stop means to limit the extent to which the latch means can overlie the flap valve member in the releasably retained closed position.

In a preferred embodiment, the axes about which the flap valve member and pivotable latch means are rotatable are substantially parallel. In this case the latch means may comprise an eccentric which extends radially from and is fixedly connected to a rotatable shaft about which the latch means pivots and which is rotatably mounted in support means connected to the generator body. When the flap valve member is in the retained closed position, a circumferential edge portion of the latch means remote from the shaft may engage the exposed side of the flap valve member to effect the closure.

The plane in which the pivotable latch means rotates may be substantially coplanar with the plane in which the flap valve member pivots or rotates between its closed and open positions. Such an arrangement allows the central engagement of the latch means with the flap valve member and thus enables a generally centrally and evenly distributed closing force to be applied to the flap valve member.

Conveniently, when the flap valve member is in the releasably retained closed position the direction of the force acting through the latch means to keep or retain the flap valve member shut lies substantially on a straight line passing through the region of engagement between the latch means and the flap valve member, the latch means, and the shaft about which the latch means rotates. This arrangement lends itself well to the provision of a strong construction of flap valve member assembly for resisting a high pressure force urging the closed flap valve member to an open position. As the pressure urging the closed flap valve member to an open position increases, the flap valve member and overlying latch means are forced harder against each other.

Furthermore, when the flap valve member is in the releasably retained closed position the latch means may be rotatable in one direction to release the latch means from engagement with the flap valve member to allow the latter to be rotatable in substantially the same rotary direction to expose the opening.

Conveniently, the generator may comprise means operable to move the latch means selectively to and from the position wherein it releasably retains the flap valve member in the closed position. Where the latch means is pivotably movable the operable means may be a lever which extends from and is connected to the pivot means of the latch means. In addition, the generator may comprise actuatable means for operating the operable means. For example, the actuating means may comprise a motor-driven or hydraulically-driven cam which may be operated remotely.

The extent to which the flap valve member can open from its closed position may be limited by the provision of a limit stop means. For example, the limit stop means may be located on the opposite side of the pivot axis of the flap valve member to the opening.

The flap valve member may be rotatably openable to such an extent from its closed position as to be capable of providing for substantially full bore opening of the opening.

Conveniently, the flap valve member and the retaining means are mounted on a supporting part which forms part of the generator body and is connected to a body part which at least in part defines part of the first chamber. Such supporting part may be releasably connected to the said body part and may define the opening associated with the first chamber. In this latter instance the supporting part, associated flap valve member and retaining means may form a discrete assembly which could be provided separately, if required, as a spare part or separate item either to be connected to a generator body part or alternatively for some other purposes.

Annular sealing means may be provided so as to be engaged around the opening between the flap valve member and the generator body when the flap valve member is in the retained closed position. Conveniently, the sealing means is seated in the surface of the generator body around the opening.

In a preferred embodiment the piston itself is a shuttle valve member which is releasably engageable with an annular sealing member provided around an opening between the first and second chambers with the latter opening providing communication between the chambers when the piston moves off of or out of engagement with the sealing member. The opening between the first and second chambers may be defined by a generator body part defining the second chamber.

Resilient means may urge the piston towards a position whereat communication between the first and second chambers is substantially prevented. The resilient means may be compression spring means which acts between the piston and abutment means fixed relative to the cylinder. The abutment means may comprise an annular shoulder at or adjacent the end of the cylinder remote from the second chamber. Conveniently, the compression spring means has an end part attached to an abutment member which abuts against the abutment means and is apertured so as to provide communication between the interior of the cylinder and the opening which is closable by the flap valve member.

Conveniently, there is provided a surface formed of friction reducing material, such as polytetrafluoroethylene, to facilitate sliding of the piston within the Cylinder. For example, at least part of the outer surface of the piston is formed of the friction reducing material. The friction reducing material may be in the form of a collar or sleeve which extends around the outside of the piston. The collar or sleeve may be located in a recess which extends around the piston.

An individual generator may, if required, be calibrated by firing the apparatus using different liquids filled to different initial heights in the liquid-containing chamber. Measurements may then be conducted to determine the frequency range of the acoustic wave energy issuing from the apparatus after each firing. From the measurements taken it will be appreciated that 'look-up' tables may be produced for a generator which correlates expected frequency outputs from the generator with different heights of different liquids used.

Figure 4:
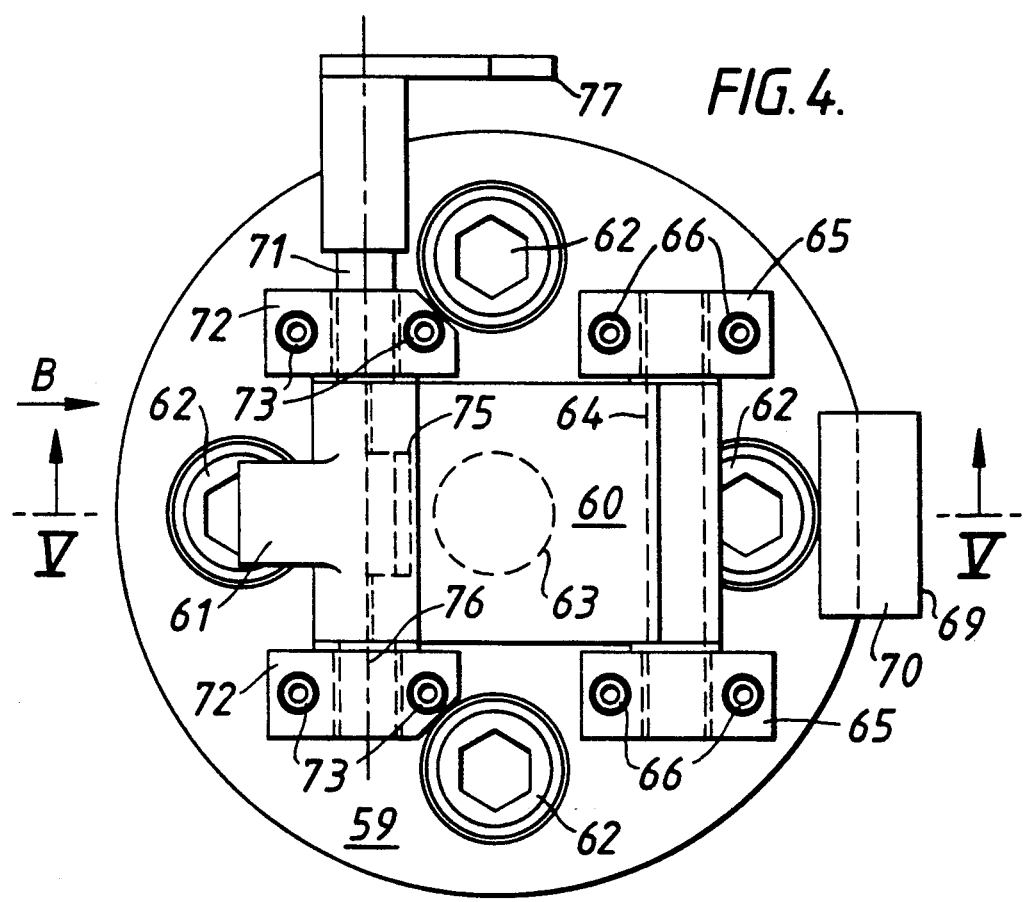
Figure 5:
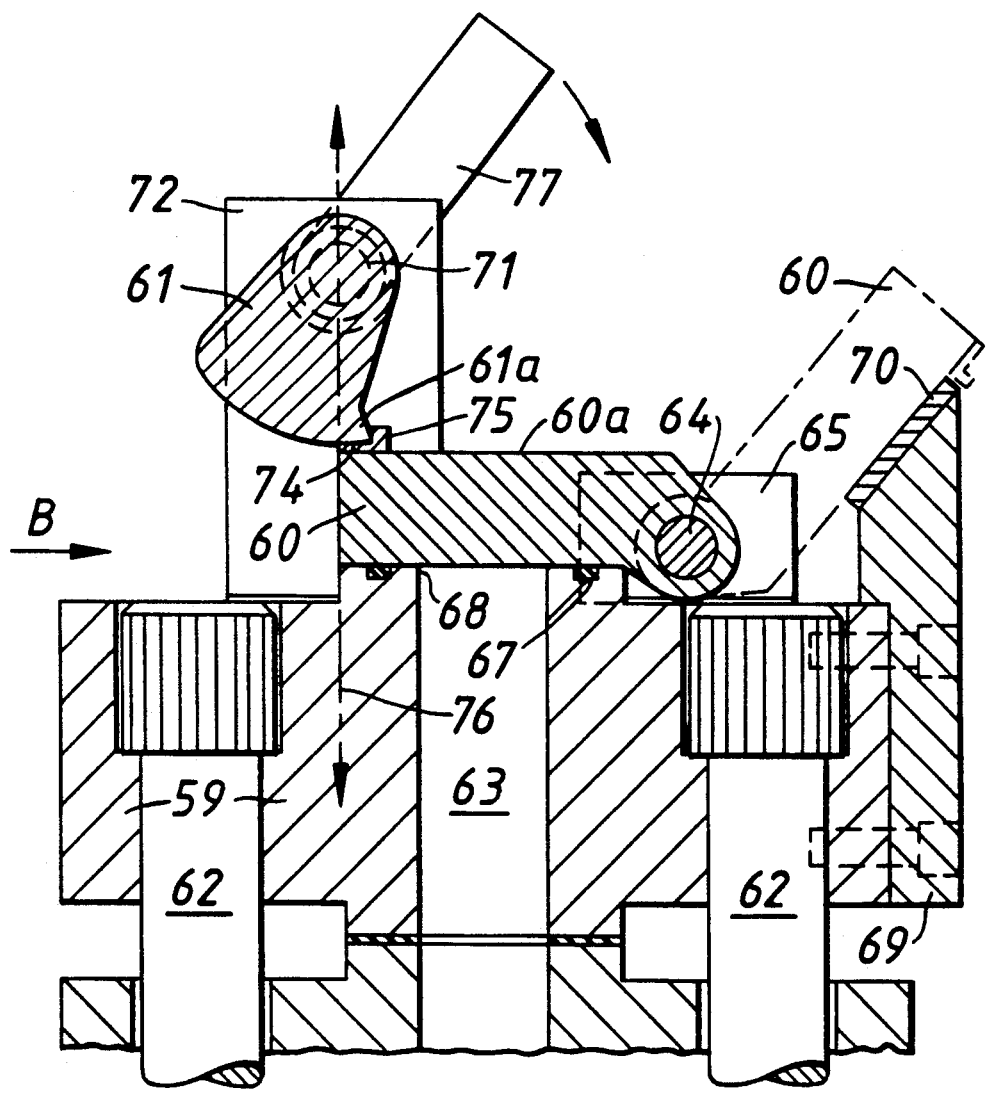
Figure 6:
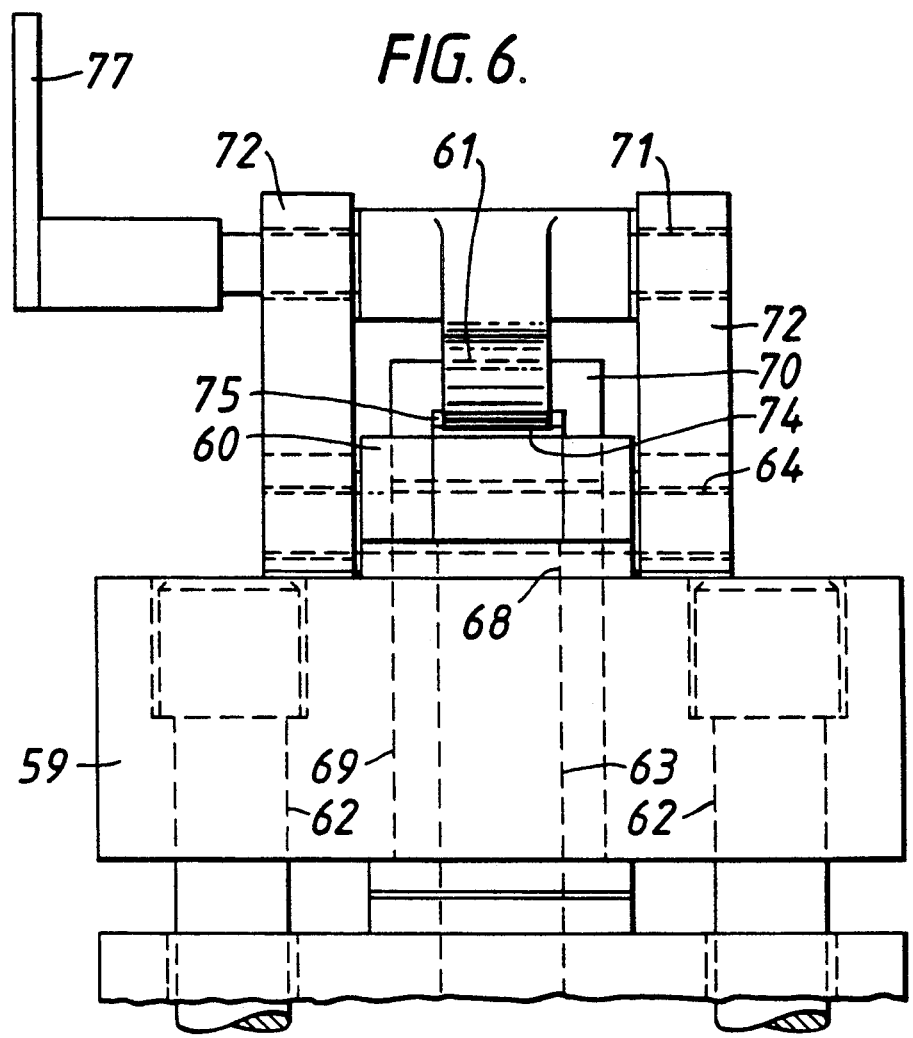
Figure 7:
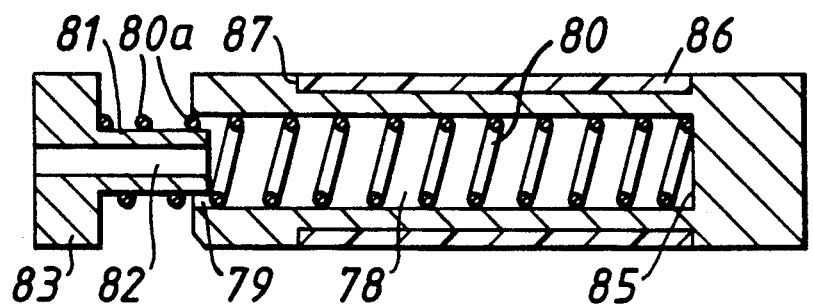

In order that the invention may be more readily understood, reference will now be made, by way of example only, to the accompanying drawings, in which:

FIGS. 1, 2 and 3 are schematic representations of three different embodiments of seismic pulse generator according to the invention, FIG. 4 is an enlarged view of one end of the generator showing a flap valve assembly in the direction of arrow A in FIG. 3, FIG. 5 is a sectional view of the flap valve assembly taken on the line V—V in FIG. 4, FIG. 6 is a view of the flap valve assembly in the direction of i n FIG. 5, and FIG. 7 is an enlarged scrap view of part of the generator of FIG. 3, showing the piston valve arrangement.

With reference to FIG. 1, a one-shot generator comprises a high pressure generally straight tubular chamber 1 adjoining an aligned second generally straight tubular chamber 2 via flanged sections 3. The lower end of the second chamber 2 is provided with a vibratable means in the form of a planar flexible membrane or diaphragm 4 which is mounted on the chamber to close the opening 5 at the end of the chamber. The membrane or diaphragm 4 may be made of reinforced rubber-material.

A common opening between the adjoining chambers is closed by a burstable diaphragm or septum 6 which is clamped between the flanges sections 3. Diaphragm 6 may, for example, be made of any suitable metal such as nickel or aluminium and is chosen to be of a thickness for the full tube diameter which will burst either at a given pressure of gas in chamber 1 or artificially by a remotely-driven piercing knife (not shown).

Gas supply means in the form of an inlet pipe 7 is connected to the first chamber 1 to permit the supply of pressurising gas to the chamber.

A full-bore ball-valve 8 may be located in chamber 1 and may be closed to protect the diaphragm or septum 6 when it is desired to employ a gas pressure in chamber 1 higher than that which can be withstood by the diaphragm or septum alone.

Inlet means in the form of a pipe 9 is also connected to chamber 2 to permit the introduction of liquid, and optionally gas, into the chamber.

A method of operating the above one-shot generator will now be described.

A first gas, for example helium, is pumped into chamber 1 through the inlet pipe 7 until the desired high pressure of say 150 bar is reached. The ball-valve 8 may be closed to protect the diaphragm or septum 6. Then liquid, such as methanol, is introduced into the chamber 2 via the inlet pipe 9.

With the chambers in a substantially vertical position, that is, with chamber 2 being the lower of the two chambers as shown in FIG. 1, and with the membrane or diaphragm H being substantially directly beneath the common opening closed by diaphragm or septum 6 as illustrated, the height of the liquid 11 is set to a desired level, for example by opening one of the valves 10 in the side or lateral wall of chamber 2 to release liquid therethrough and allow the liquid to fall to the level of the valve. The valve can then be closed. The remainder of chamber 2 is then filled with a second gas of lower sound speed than the first gas to a pressure less than that in chamber 1 for example to 1 bar. This second gas may, for example, be carbon dioxide, argon or air and can be pumped into the chamber via the inlet pipe 9.

With the generator in the substantially vertical position the ball-valve 8 is then opened by remote operation such as by an electric servo-system (not shown) in accordance with known practice. As a result the diaphragm or septum 6 is burst by the pressure of the gas in chamber and communication is caused between the chambers 1,2 and a shock wave propagates into and through the gas above the liquid in chamber 2 at a velocity typically in excess of 1200 ms$^{-1}$ and meets the surface of the liquid. The shock penetrates into the liquid and is converted to a plane sub-sonic acoustic wave with a pressure amplitude of typically 70 to 100 bar. The pressure pulse has been found to propagate at roughly the same amplitude through the liquid to the vibratable diaphragm or membrane 4 at the end of chamber 2. The diaphragm is caused to vibrate and transmit acoustic energy to the surroundings. As energy is being withdrawn from the generator, via the diaphragm, the pressure amplitude decreases, although the frequency has been found to be substantially unaltered. Thus, the external seismic pulse takes on the form of a train of amplitude-damped pressure pulses.

FIG. 2 shows a seismic pulse generator which can be operated or "fired" repetitively and comprises a high pressure chamber 14 adjoining a generally straight tubular chamber 15 by means of a connecting member 16 to which adjacent ends of the two chambers are sealingly secured. Within the chamber 14 is an actuating chamber 17 which is welded to the back wall 18 of the chamber 14. A sealing piston 19 is freely slidable in a portion of the actuating chamber, which thus provides a cylinder for the piston, to close a common opening 20 between the chambers 14,15 by engaging a taper seal 21 which defines the mouth of the common opening 20. The actuating chamber 17 is secured to, and has a rear exit bore 22 which extends through the back wall 18 of the chamber 14. The rear exit bore 22 is of smaller cross-section than that portion of the actuating chamber which accomodates the sealing piston. The rear of that portion of the actuating chamber 17 has a flat face which is engagable by a rubber pad 23 on the back of the piston. A poppet gas-release valve 24 seals the rear exit from the actuating chamber and is actuated by a motor-driven or hydraulically driven cam 25.

As illustrated in FIG. 2, the lower end of the second chamber 15 is provided with a vibratable means comprising a piston 26 having an actuatable portion 27 slidably and sealingly mounted in the chamber 15 and a connecting portion 28 which passes through an associated opening 30 in the lower end of the chamber and which is in sliding and sealing contact with the end portion of the chamber defining the opening. An external portion 29 of the piston outside the chamber is connected to the actuatable portion 27 by the connecting portion 28. The actuating and external portions are in the form of planar, circular discs. Inlet valve means 31 is provided in the wall of the chamber for introducing a gas, such as air or nitrogen to provide compressed gas in the chamber between the actuatable portion 27 and the opening 30 to serve as resilient means to space and bias the actuatable portion 27 from the opening. The piston 26 is vibratable or reciprocable back and forth substantially along the longitudinal axis of the tubular chamber 15.

Gas supply means in the form of an inlet pipe 32 is connected to the chamber 14 to permit the supply of pressurising gas to the chamber.

A bleed or fine-hole 33 is provided through the wall of the actuating chamber so that there is restricted communication between the chamber 14 and the bore 22 and thus the portion of the actuating chamber 17 in which the piston 19 slides.

Inlet means in the form of a pipe 34 is connected to chamber 15 to permit the introduction of liquid, and optionally gas, into the chamber.

A method of operating the above repetitively operable generator will now be described above.

The first stage in priming the generator for firing involves closing the poppet valve 24 by moving the cam 25 to the position shown in FIG. 2, exhausting any gases from the chambers 14,15 and 17, and pressurising the high pressure chamber 14 to the required pressure with a gas such as helium. This pressurisation also causes the pressurisation of the actuating chamber 17 via the finehole 33 to reseat the piston 19 on the seal 21 to seal off communication between the chambers 14 and 15.

Liquid, for example methanol, can then be introduced into the chamber 15. With chamber 15 generally vertical, the level of the liquid can be set to that desired by, for example, opening one of the valves 35 in the longitudinal side wall of the chamber to release liquid therethrough and allow the liquid to fall to the level of the chosen valve. The valve can then be closed. The remainder of the chamber 15 above the liquid can then be filled with a gas in a similar manner to that described above with respect to the FIG. 1 embodiment.

With the generator in the substantially vertical position, the cam 25 is driven into the poppet-valve release position. As a result of such release there is a rapid loss of gas via the rear exit bore 22 of the actuating chamber 17 while the high resistance-to-flow fine hole 33 prevents the gas pressure in the high pressure chamber 14 falling appreciably. The imbalance of pressure between the high pressure chamber 14 and the rear exit bore 22 and the portion of the actuating chamber behind the sealing piston 19 causes the latter to be driven back to seat the rubber pad 23 on the rear flat-face of the actuating chamber. Thus, communication is caused between the chambers 14 and 15 and this allows the gas from the high pressure chamber 14 to discharge rapidly into the chamber 15 with the result that a shock wave propagates into and through the gas above the liquid in the chamber and meets the surface of the liquid. As described in connection with FIG. 1 above, the shock penetrates into the liquid and is converted to a plane sub-sonic acoustic wave which, it is envisaged, causes the piston to vibrate back and forth longitudinally in the chamber and, via the external portion, transmit acoustic energy to the surroundings.

In order to prepare the generator for firing again, the setting or priming procedure is repeated.

For further information in connection with those portions of the embodiments of generator shown above the break lines in the chambers 2 and 15 in FIGS. 1 and 2, respectively, reference may be made to U.S. Pat. No. 4,667,766 (Melvin).

With reference to FIG. 3, another seismic pulse generator which can be operated or "fired" repetitively is shown. It will be understood that, in use, the generator illustrated will be oriented in the same way as the generators of FIG. 1 and 2, i.e., rotated clockwise through 90° from the orientation shown in FIG. 3. The generator of FIG. 3 comprises a first body part 40 which defines a first chamber 41 for relatively high pressure gas and is connected by means of a ring seal 42 and circular flange clamp 43 to a second generally tubular body part 44 which in turn defines a second chamber 45.

The second chamber 45 has towards the end 46 remote from the first chamber 41 a circumferential gap 47 which is closed by a vibratable means in the form of a tube 48 of flexible material, such as reinforced rubber-material or similar composite material. The tube 48 also serves to connect main chamber portion 45a to end chamber portion 45b together. The tube 48 is capable of vibrating both longitudinally and radially with respect to the longitudinal axis of the tube 48 or the chamber 45. In a modification (not shown) of the lower part of the liquid-containing chamber (below the "break-line") of the FIG. 3 embodiment the end 46 may itself be a vibratable means which is in the form of a planar flexible membrane or diaphragm, for example similar to the one shown in FIG. 1 and indicated by the reference numeral 4, and which is capable of vibrating axially with respect to the longitudinal axis of the second chamber. In yet another modification of the FIG. 3 embodiment (also not shown) the tube 48, the end 46 and the tubular part of the second chamber connecting the tube 48 to the end 46 may all together form a single-piece cylindrical or tubular member of flexible material and closed at one end. The cylindrical or tubular wall of the single-piece member is capable of vibrating radially in response to the shock wave so as to produce radial acoustic pulses whilst the closed end of the member forms a planar membrane or diaphragm and is capable of vibrating axially of the longitudinal axis in response to the shock wave so as to produce longitudinal acoustic pulses. Thus, radially and longitudinally propagating acoustic pulses are produced by the same member. The modifications described above may also be incorporated into the lower parts of the second or liquid-containing chambers of the FIG. 1 and FIG. 2 generator embodiments.

An integral generally tubular body portion 49 of part 40 extends part way into the first chamber 41. Together, the body portion 49 and that part of the main body part 40 from which body portion 49 extends define smaller and larger internal diameter bore portions 50a,50b through the body part 40. The body portion 49, in part, provides a cylinder which defines the bore portion 50b of larger diameter and which constitutes an actuating chamber 51 for piston shuttle valve 52. At the end of the first body part 40 remote from the second body part 44, there is secured a flap valve assembly 53. Bleed or fine-holes 54 in body portion 49 provides communication between the chamber 41 and bore portions 50a and 50b. The piston, which constitutes a shuttle valve member, is operable to be releasably engageable with an annular sealing member 55 provided in end face 44a of body part 44 around opening 56. The opening 56, which is defined by the second body part 44, is to provide communication between the chambers 41 and 45 when the piston moves out of engagement with the annular sealing member, as will be described in more detail below.

A gas supply means in the form of an inlet pipe 57 is connected to the first body part 40, to permit the supply of pressurising gas to the chamber 41 and bore portions 50a, 50b.

Inlet means in the form of a pipe 58 is connected to chamber 45 to permit the introduction of liquid, and optionally gas, into the chatter.

The construction of the flap valve assembly 53 may be more clearly seen having regard to FIGS. 4 to 6 of the drawings.

The flap valve assembly in this embodiment is a discrete part of the generator construction and comprises a supporting part 59, a flap valve member 60, and latch means 61 for releasably retaining the flap valve member in a closed position. The supporting part 59 is releasably secured or connected to the end of the body part 40 by means of bolts 62 or the like. A bore 63 extends through the supporting part 59 and communicates with the bore portions 50a and 50b which extend through the body part 40.

The flap valve member is pivotably mounted on the supporting part by means of a hinge arrangement comprising a shaft 64 about which the flap valve member 60 pivots, and aligned journal members 65 in which the opposite ends of the shaft 64 are rotatably mounted. The journal members 65 are secured to the supporting part by, for example, bolts 66.

The flap valve member is pivotably movable between a closed position, as shown for example in full lines in FIG. 5, and a fully open position, as shown in broken outline in the same figure. In the closed position the flap valve member engages an annular seal 67 seated in a protruding planar face portion of the outer face of the supporting part 59 around an opening 68 which is defined by the supporting part at the outer end of the bore 63, thereby to close the opening and seal off the aligned bores 50a, 50b and 63.

On reaching the fully open position, which is beyond a position which provides for full bore opening of opening 68, the flap valve member 60 comes into contact with a limit stop means 69 to prevent further opening of the member 60. The limit stop means is secured to the supporting part 59 on the side of the shaft 64 remote from the opening and has a planar contact face 70 disposed at such an angle that the exposed planar face 60a of the flap valve member 60 meets the contact face full-face as can be seen from the broken outline position of the flap valve member in FIG. 5.

The latch means 61 is in the form of a rotatable eccentric latch or cam which extends radially from and is fixedly connected to a rotatable shaft 71 which is rotatably mounted in support means constituted by aligned journal members 72 which are secured to the supporting part 59 for example, by means of bolts 73. The latch 61 and flap valve member 60 are arranged such that the respective shafts 71, 64 about which they are rotatable are substantially parallel to each other and that the planes in which they are rotatable are substantially coplanar.

The latch 61 is rotatable about the shaft 71 to and from a position wherein it releasably retains the flap valve member 60 in the closed position as shown in FIG. 5. In order to retain the flap valve member 60 in the closed position, a circumferentially protruding edge portion 61a of the latch relatively remote from the shaft 71 overlies and centrally engages the exposed outer side or face 60a of the flap valve member, via seating 74 provided on the latter, adjacent the free edge of the flap valve member remote from the shaft 64. The seating 74 has a stop portion 75 against which the latch abuts to limit the extent to which the latch 61 can overlie the flap valve member in the closed position.

When the flap valve member 60 is in the releasably retained closed position the direction of the force acting through the latch 61 to keep the flap valve member shut lies substantially on a straight line 76 passing through the region of engagement between the latch and flap valve member 60 (via the seating 74), the latch 61, and the shaft 71 about which the latch rotates. This arrangement can be constructed to resist strong forces urging the flap valve member to open as a result of a high pressure which may be present in the chamber 41 and bores 63, 50a, 50b when pressurised with gas. Increase in pressure in bore 63 will tend to hold the latch 61 in position against seating 74 with greater force.

As viewed in FIG. 5 the latch 61 is rotated in a clockwise direction in order to release the latch from engagement with the flap valve member to allow the latter to be rotated, also in the clockwise direction, to uncover or expose the opening 68.

The latch 61 and flap valve member 60 constructions and their relative dispositions are such that when the trailing edge of the circumferential edge portion 61a of the latch moves off of the seating 74, the flap valve member is free to rotate until it contacts the stop means.

Connected to and extending from one end of the shaft 71 is an operable means comprising a lever 77 which can be selectively moved to and from a position corresponding to the position whereat the latch 61 engages the flap valve member 60 to releasably retain the latter in the closed position.

Remotely actuatable means (not shown) such as a motor-driven or hydraulically-driven cam may be provided to operate the lever 77.

The piston valve 52 and its mounting in the actuating chamber 51 may be more readily seen in FIG. 8 of the drawings.

The piston valve has a recess 78 extending axially of the bore portion 50b and having a mouth 79 which opens in the direction towards the flap valve assembly 53. A helical compression spring 80 is partly located within the recess 78. An end portion 80a of the spring 80 protruding from the mouth of the recess is fitted onto a spigot 81. An axial aperture or bore 82 extends through the spigot to allow communication between the bore 63 and bore portions 50a, 50b. Spigot bore 82 is a relatively low resistance-to-gas flow bore. The spigot has a flanged end portion 83 which abuts against an annular shoulder 84, forming a stop, provided at the junction of the bore portion 50a and chamber 51. The compression spring 80 acts between the flanged end portion 83 abutting the annular shoulder 84 and the closed end 85 of the recess in the piston valve 52 to urge the latter into engagement with the annular sealing member 55 and substantially prevent communication between chambers 41 and 45. As can be seen from FIG. 3, a portion of the piston protrudes beyond the free end of the chamber 51 remote from the annular shoulder 84.

To facilitate sliding of the piston valve 52 within the associated cylinder forming the actuating chamber 51, a collar or sleeve 86 made of friction reducing material, such as polytetrafluoroethylene, is located in an annular recess 87 extending around the piston valve to provide the latter with an outer surface formed of friction reducing material slidingly to engage the interior surface of the chamber 51.

A method of operating this embodiment of seismic pulse generator will now be described.

Firstly it is necessary to "set" or prime the generator for firing or producing acoustic energy. With the flap valve member 60 releasably retained in its closed position over the opening 68 by the latch 61 any gases present in chambers 41, 45 and bore portions 50a, 50b and bore 63 are substantially exhausted therefrom. A gas of relatively high sound speed, preferably helium or hydrogen, is pumped via the inlet pipe 57 into bore portion 50a, and thus into bore 63 and actuating chamber 51 with which bore portion 50a communicates. During this pressurising stage high pressure chamber 41 is pressurised via fine holes 54. The piston valve 52 is caused to engage sealingly with the annular sealing means 55 around the opening 56 to seal off communication between the chambers 41 and 45. The chamber 41 is pressurised to a predetermined pressure.

Liquid, for example methanol, is then introduced into the chamber 45 via inlet pipe 58 to a height above the top edge of the flexible tube 48. With the chamber 45 substantially vertical, the level of the liquid can be set to that required by, for example, opening one of the valves 88 in the longitudinal side wall of the chamber 45 to release liquid from the chamber to allow the liquid level to fall to the height of the valve. The valve is then closed. The space above the liquid in the chamber 45 is then filled with a gas, such as carbon dioxide, in a manner similar to that described with reference to FIG. 1.

With the generator in the substantially vertical position, the lever 77 is operated by the actuating means to selectively move the latch 61 out of engagement with the flap valve member 60 so that the latter swings open very rapidly to a full-bore open position with respect to opening 68. With this construction of flap valve assembly the full-bore open position of the flap valve member may be reached in under 0.01 sec. The uncovering of the opening 68 results in rapid loss of gas from the relatively low resistance-to-flow bore 63, bore portions 50a, 50b and spigot bore 82 through that opening. However, the relatively high resistance-to-flow fine-holes 54 prevent the gas pressure in the high pressure chamber 41 falling appreciably over the same time period. This results in an imbalance in pressure between the high pressure chamber 41 and the bore portions 50a, 50b and bore 63 behind the piston valve 52 so that the pressure keeping the shuttle valve 52 in the closed position is removed. Such pressure imbalance overcomes the force of compression spring 80 urging the shuttle valve into engagement with the annular sealing means 55 to cause the piston valve to disengage from the sealing means 55 and move away from the opening 56, to a retracted position wherein the rear end of the piston valve reaches the flanged end portion 83 of the spigot 81 and the front end of the piston valve reaches a position substantially level with the free end of the cylinder 51 thereby allowing communication between the chambers 41 and 45. Thus gas from the chamber 41 flows rapidly into the chamber 45 and forms a shockwave which propagates into and through the gas above the liquid in the chamber 45 and which meets the surface of the liquid. Again, as described in connection with FIG. 1 above, the shock penetrates into the liquid and is converted to a plane sub-sonic acoustic wave which, it is envisaged, causes the flexible material of the tube to vibrate radially and longitudinally of the longitudinal axis of the chamber 45 and thereby transmit pressure pulses in the form of acoustic energy to the surroundings.

In order to "fire" another shock the described sequence for setting or priming and firing the generator is repeated.

In the above described embodiments, and modifications thereof, the generators are fired in substantially vertical positions so that the upper surfaces of the membrane or diaphragm 4 (FIG. 1), of the actuatable portion 27, and of the second chamber end 46 are not only substantially horizontal, that is directly below the closed common openings between the respective two chambers but are also substantially parallel to the upper surface of the liquid in the second chamber immediately prior to the communication between the chambers being effected. Such relative positions of the liquid surface and the surfaces mentioned above at the lower end of the second chambers is believed to enable better or more reflections of the acoustic wave pulse in the liquid between such upper and lower "reflecting" surfaces.

Each of the three embodiments of generator described above (and any modifications thereof described above) may be modified by arranging for the associated liquid-containing chamber to have a lower part which includes the vibratable means (such as shown in FIG. 1, FIG. 2 or FIG. 3 below the "break-line" in each chamber) in the form shown in either one of the other two embodiments.

It will also be appreciated that the liquid-containing chambers of the above described embodiments, and the modified embodiments referred to above, may be substantially completely filled with the liquid, so that on causing communication between the pressurised-gas chamber and the liquid-filled chamber, it is believed that substantially instantaneous shock wave formation conditions are produced which result in almost instantaneous degeneration of the shock wave to an acoustic pulse in the liquid.

Some of the investigations made by the Applicants have employed a generator having a modified form to that shown in FIG. 2, wherein the lower part of the liquid-containing chamber 15 generator of FIG. 2 was replaced with a lower part (i.e. below the break line) as shown in FIG. 1 and wherein the vibratable means was provided by a stainless-steel diaphragm. A piezoelectric pressure transducer was provided beneath the diaphragm to detect the frequency of the output pulse. The high pressure chamber 14 was primed by being pressurised with helium to a pressure of about 1200 psi. The predominant frequencies of the pulses obtained using different heights of ethanol or water as the liquid in the liquid-containing chamber, and air at a pressure of about 14.7 psi above the liquid, are shown below in Table 1. The length of the liquid-containing chamber was about 2 m and the internal bore diameter of this chamber was about 2.5 cm.

TABLE 1

| liquid | Height of liquid (Approx) (cm) | Predominant frequency of pulse (approx) (Hz) |
| --- | --- | --- |
| ethanol | 10.4 | 2300 |
| ethanol | 20.8 | 1300 |
| water | 10.4 | 3100 |

TABLE 1-continued

| liquid | Height of liquid (Approx) (cm) | Predominant frequency of pulse (approx) (Hz) |
| --- | --- | --- |
| water | 20.8 | 1600 |

By using a similar liquid-containing chamber set-up as described above but with the high pressure chamber arrangement replaced by the arrangement shown in FIG. 1 having the burstable diaphragm 6, illustrative examples of the predominant frequencies of the pulses obtained are shown below in Table 2.

TABLE 2

| Liquid | Height of Liquid (approx.) (cm) | Gas Occupying Space above liquid at pressure of 14.7 psi | Predominent frequency of pulse (approx.) (Hz) |
| --- | --- | --- | --- |
| Water | 25 | helium | 1495 |
| Water | 100 | helium | 427 |
| Perfloroheptane | 25 | helium | 640 |
| ethanol | 100 | carbon dioxide | 244 |
| Cyclohexane | 200 (full) | — | 300 |
| Water | 200 (full) | — | 300 |
| methanol | 200 (full) | — | 300 |

It is Applicants understanding that the frequency of the pulse is dependent on the sound velocity of the liquid and on the height of the liquid. Since cyclohexane, water and methanol have similar sound velocities similar pulse frequencies would be expected where these liquids are used at the same heights. This view appears to be supported by the last three entries in Table 2.

We claim:

1. A method of generating acoustic wave energy, said method comprising producing a shockwave above the upper surface of a liquid contained in a chamber of a device so that the shockwave impinges on the surface of the liquid and thereby produces an acoustic wave in the liquid to cause a vibratable means mounted on the chamber so as to close off an opening in the chamber, thereby defining a liquid-filled cavity portion of the chamber, and spaced from and beneath the surface of the liquid to vibrate and thereby produce acoustic wave energy whose frequency is dependent on the length of the liquid-filled cavity portion.

2. A method as claimed in claim 1, wherein the device further comprises a gas-pressurisable chamber which serially adjoins the chamber containing the liquid and is connected thereto by a common closed opening, said method further comprising pressurising the gas-pressurisable chamber with a first gas, and then causing the chambers to communicate by way of the common opening so that the first gas provides the shockwave which impinges upon the surface of the liquid and produces the acoustic wave in the liquid.

3. A method as claimed in claim 2, wherein the first gas is selected from the group consisting of helium; an explosive mixture of air and hydrogen; and helium, oxygen and hydrogen.

4. A method as claimed in claim 3, wherein the pressure of the first gas lies in the range of 20 to 350 bars.

5. A method as claimed in claim 2, wherein the liquid-containing chamber is partly filled with the liquid and a second gas of lower sound speed and pressure than the first gas occupies the space in the liquid-containing chamber above the surface of the liquid prior to causing the chambers to communicate.

6. A method as claimed in claim 5, wherein the second gas is a gas selected from the group consisting of carbon dioxide; argon; and air.

7. A method as claimed in claim 5, wherein the pressure of the second gas lies in the range 0.5-10 bar.

8. A method as claimed in claim 1, wherein the vibratable means vibrates within the range 10 to 10,000 Hz.

9. A method as claimed in claim 1, wherein the liquid is methanol.

10. An acoustic wave energy generator comprising a body having an internal gas-pressurisable upper first chamber, and a lower second chamber which serially adjoins said upper chamber and is connected thereto by a common closed opening, which includes a vibratable means and into which, in use, a liquid is introduced to cover said vibratable means such that the upper surface of the liquid is at a level above the vibratable means; said vibratable means being mounted on the second chamber so as to close an associated opening in the second chamber, thereby defining a liquid-filled cavity portion of the second chamber, and said generator further comprising means for, when the first chamber is pressurized with a first gas and the second chamber is at least partially filled with the liquid which covers the vibratable means, causing opening of said common closable opening to thereby cause communication between the chambers to permit a shockwave emanating from the first chamber to impinge on the upper surface of the liquid to produce an acoustic wave in the liquid such that the vibratable means reflects the acoustic wave back to the surface of the liquid and such that the vibratable means vibrates so as to produce acoustic wave energy in response to the acoustic wave in the liquid, such that the frequency of the acoustic wave energy is dependent on the length of the liquid-filled cavity portion.

11. A generator as claimed in claim 10, including means for setting the level of liquid in the second chamber at at least one substantially predetermined height.

12. A generator as claimed in claim 10 wherein the vibratable means comprises a flexible diaphragm.

13. A generator as claimed in claim 12, wherein the flexible diaphragm is capable of withstanding a pressure of up to 100 bar.

14. A generator as claimed in claim 12, wherein the second chamber has an end which is remote from the first chamber and which defines the associated opening and wherein the flexible diaphragm which closes the opening is of planar form.

15. A generator as claimed in claim 10 wherein the vibratable means comprises a piston comprising an actuatable portion slidably and sealingly mounted in the chamber; a connecting portion which passes through the associated opening and which is in sliding and sealing contact with the portion of the second chamber defining the associated opening; and an external portion outside the second chamber which is connected to the actuatable portion by the connecting portion, and resilient means, contained in the second chamber between the actuatable portion and associated opening, for, in use, spacing the actuatable portion from the associated opening.

16. A generator as claimed in claim 15, wherein the resilient means is a compressed gas.

17. A generator as claimed in claim 16, wherein the second chamber has inlet means for introducing the compressed gas into the chamber.

18. A generator as claimed in claim 10, wherein the vibratable means and common opening are substantially directly opposite each other and have a substantially common axis.

19. A generator as claimed in claim 10, wherein the vibratable means has a vibrational axis which, when the generator is in use, is substantially perpendicular to the surface of the liquid in the second chamber immediately prior to the communication between the chambers being effected.

20. A generator as claimed in claim 10 wherein the opening closed by the vibratable means is in a side or lateral wall of the second chamber.

21. A generator as claimed in claim 20, wherein opening comprises a circumferential gap in the second chamber and wherein the vibratable means comprises a flexible member of tubular form which closes said circumferential gap.

22. A generator as claimed in claim 10, wherein at least the portion of the second chamber for containing the liquid is of substantially straight tubular form.

23. A generator as claimed in claim 10, wherein the means operable to cause opening of the common closed opening comprises a flap valve member pivotable about a pivot axis from a closed position wherein the valve member closes an opening associated with the first chamber to an open position wherein the opening is uncovered, means for releasably retaining the flap valve member in the closed position, and a gas operated piston which is slidably movable within an associated cylinder and which, when the first chamber is pressurised and the flap valve member is released from its closed position to uncover the associated opening, moves to allow the communication between the chambers.

24. An acoustic wave energy generator comprising a body having an internal gas-pressurisable upper first chamber, and a lower second chamber which serially adjoins said upper chamber and is connected thereto by a common closed opening, which includes a vibratable means and into which, in use, a liquid is introduced to cover said vibratable means such that the upper surface of the liquid is at a level above the vibratable means; said vibratable means being mounted on the second chamber so as to close an associated opening in the second chamber, thereby defining a liquid-filled cavity portion of the second chamber, and said generator further comprising means for, when the first chamber is pressurized with a first gas and the second chamber is at least partially filled with the liquid which covers the vibratable means, causing opening of said common closed opening to thereby cause communication between the chambers to permit a shockwave emanating from the first chamber to impinge on the upper surface of the liquid to produce an acoustic wave in the liquid such that the vibratable means vibrates so as to produce acoustic wave energy in response to the acoustic wave in the liquid; and means for reflecting the acoustic wave back to the surface of the liquid, such that the frequency of the acoustic wave energy is dependent on the length of the liquid-filled cavity portion.

25. A generator as claimed in claim 24, including means for setting the level of liquid in the second chamber at at least one substantially predetermined height.

26. A generator as claimed in claim 24 wherein the vibratable means comprises a flexible diaphragm.

27. A generator as claimed in claim 6, wherein the flexible diaphragm is capable of withstanding a pressure of up to 100 bar.

28. A generator as claimed in claim 24 wherein the vibratable means comprises a piston comprising an actuatable portion slidably and sealingly mounted in the chamber; a connecting portion which passes through the associated opening and which is in sliding and sealing contact with the portion of the second chamber defining the associated opening; and an external portion outside the second chamber which is connected to the actuatable portion by the connecting portion, and resilient means, contained in the second chamber between the actuatable portion and associated opening, for, in use, spacing the actuatable portion from the associated opening.

29. A generator as claimed in claim 28, wherein the resilient means is a compressed gas.

30. A generator as claimed in claim 29, wherein the second chamber has inlet means for introducing the compressed gas into the chamber.

31. A generator as claimed in claim 24, wherein at least the portion of the second chamber for containing the liquid is of substantially straight tubular form.

32. A generator as claimed in claim 24, wherein the means operable to cause opening of the common closed opening comprises a flap valve member pivotable about a pivot axis from a closed position wherein the valve member closes an opening associated with the first chamber to an open position wherein the opening is uncovered, means for releasably retaining the flap valve member in the closed position, and a gas operated piston which is slidably movable within an associated cylinder and which, when the first chamber is pressurised and the flap valve member is released from its closed position to uncover the associated opening, moves to allow the communication between the chambers.

* * * * *